United States Patent
Sawai

(10) Patent No.: US 10,481,309 B2
(45) Date of Patent: Nov. 19, 2019

(54) PRISM UNIT AND PROJECTOR

(71) Applicant: Konica Minolta, Inc., Tokyo (JP)

(72) Inventor: Yasumasa Sawai, Nara (JP)

(73) Assignee: Konica Minolta, Inc., Tokyo (JP)

( * ) Notice: Subject to any disclaimer, the term of this patent is extended or adjusted under 35 U.S.C. 154(b) by 62 days.

(21) Appl. No.: 15/555,218

(22) PCT Filed: Feb. 16, 2016

(86) PCT No.: PCT/JP2016/054380
§ 371 (c)(1),
(2) Date: Sep. 1, 2017

(87) PCT Pub. No.: WO2016/140049
PCT Pub. Date: Sep. 9, 2016

(65) Prior Publication Data
US 2018/0059293 A1 Mar. 1, 2018

(30) Foreign Application Priority Data

Mar. 2, 2015 (JP) .................................. 2015-040359

(51) Int. Cl.
*G02B 5/04* (2006.01)
*G03B 21/14* (2006.01)
*G03B 21/56* (2006.01)
*G03B 21/00* (2006.01)
*G03B 21/20* (2006.01)
*G03B 21/28* (2006.01)
(Continued)

(52) U.S. Cl.
CPC ............. *G02B 5/04* (2013.01); *G03B 21/008* (2013.01); *G03B 21/14* (2013.01); *G03B 21/2066* (2013.01); *G03B 21/28* (2013.01); *G03B 21/567* (2013.01); *G02B 5/08* (2013.01); *G02B 26/008* (2013.01)

(58) Field of Classification Search
CPC ...... G02B 5/04; G02B 26/008; G03B 21/567; G03B 21/14
See application file for complete search history.

(56) References Cited

FOREIGN PATENT DOCUMENTS

| JP | 2005-092206 A | 4/2005 |
|----|---------------|--------|
| JP | 2008-268865 A | 11/2008 |

(Continued)

OTHER PUBLICATIONS

International Search Report issued in corresponding International Application No. PCT/JP2016/054380 dated Apr. 26, 2016 (5 pages).
(Continued)

*Primary Examiner* — Jack Dinh
(74) *Attorney, Agent, or Firm* — Osha Liang LLP

(57) ABSTRACT

A prism unit includes a first prism and a second prism. The first prism includes a first optical surface that allows the illumination light to enter the prism, a second optical surface that reflects the illumination light that entered through the first optical surface, and a third optical surface that allows the illumination light reflected by the second optical surface to exit the prism. The second prism includes a fourth optical surface that forms a first air gap with the second optical surface and allows the illumination light that exited through the second optical surface to enter the prism, and a fifth optical surface that allows the illumination light that entered through the fourth optical surface to exit the prism.

8 Claims, 12 Drawing Sheets

(51) Int. Cl.
*G02B 5/08* (2006.01)
*G02B 26/00* (2006.01)

(56) References Cited

FOREIGN PATENT DOCUMENTS

| | | |
|---|---|---|
| JP | 2012-247778 A | 12/2012 |
| JP | 2014-085669 A | 5/2014 |

OTHER PUBLICATIONS

Written Opinion issued in corresponding International Application No. PCT/JP2016/054380 dated Apr. 26, 2016 (12 pages).

PRIOR ART

PRISM UNIT AND PROJECTOR

TECHNOLOGICAL FIELD

The present invention relates to a prism unit and a projector.

BACKGROUND

A digital micromirror device is known as a reflective image display device mounted on a projector. The digital micromirror device has an image display surface composed of a plurality of small micromirrors and controls tilting of each mirror surface on the image display surface to modify illumination light in intensity to form an image.

A reflective image display device such as a digital micromirror device generates unnecessary light referred to as OFF light which is not used for projecting an image. For example, in a three-chip (multi-channel) type projector including a color decomposition/compositing prism and three reflective image display devices, OFF light processing is performed by adjusting the color decomposition/compositing prism to be high in level.

Japanese Laid-Open Patent Publication No. 2012-247778 (Patent Document 1) relates to a projection lens and a projector having a magnification changing function, and discloses an invention relating to a projecting zoom lens most suitable for achieving a large magnification changing ratio and a projector using the same.

Patent Document

PTD 1: Japanese Laid-Open Patent Publication No. 2012-247778

In recent years, small projectors have increasingly been required. For example, a portable small projector is required to be reduced in thickness, and it is necessary to miniaturize an optical system including a prism adopted in the projector.

SUMMARY

One or more embodiments of the present invention provide a prism unit and projector having a configuration capable of miniaturizing an optical system including a prism.

A prism unit according to one or more embodiments of the present invention is a prism unit which guides incident illumination light to a reflective image display device to illuminate the reflective image display device and guides projection light, which is reflected by the reflective image display device, to an externally provided projection lens and allows the projection light to exit, the prism unit comprising: a first prism including a first optical surface allowing the illumination light to enter the prism, a second optical surface totally reflecting the illumination light having entered through the first optical surface, and a third optical surface allowing the illumination light totally reflected by the second optical surface to exit the prism; a reflecting means reflecting the illumination light that has exited the third optical surface with an angular difference to allow the illumination light to again enter the third optical surface so as to allow the illumination light to be transmitted through the second optical surface and thus exit; a second prism including a fourth optical surface forming a first air gap with the second optical surface and allowing the illumination light having exited through the second optical surface to enter the prism, and a fifth optical surface allowing the illumination light having entered through the fourth optical surface to exit the prism; and a third prism including a sixth optical surface forming a second air gap with the fifth optical surface and allowing the illumination light having exited through the fifth optical surface to enter the prism, a seventh optical surface allowing the illumination light having entered through the sixth optical surface to exit the prism, and an eighth optical surface allowing projection light to exit the prism, the projection light being the illumination light exiting through the seventh optical surface, incident on and reflected by an externally provided reflective image display device, entering the prism through the seventh optical surface, and totally reflected by the sixth optical surface.

In one or more embodiments, the reflecting means is a reflective film provided on the third optical surface.

In one or more embodiments, the third optical surface is a convex curved surface bulging outward.

In one or more embodiments, an angle formed by the first optical surface and the fourth optical surface is larger than an angle formed by the first optical surface and the fifth optical surface.

In one or more embodiments, a refractive index of the first prism is smaller than a refractive index of the third prism.

A projector according to one or more embodiments of the present invention comprises: an illumination unit generating illumination light; a prism unit according to any one of those described above; and a reflective image display device disposed opposite to the seventh optical surface of the prism unit.

In one or more embodiments, when a distance between an intersection of a principal ray of the illumination light and the first optical surface and a surface of the reflective image display device is represented as L1, a distance between an intersection of the principal ray of the illumination light and the sixth optical surface and the surface of the reflective image display device is represented as L6, and a distance between an intersection of a principal ray of the projection light reflected by the reflective image display device and the sixth optical surface and the surface of the reflective image display device is represented as P6, a relationship of |P6−L1|≤|P6−L6| is comprised.

In one or more embodiments, the projector further comprises: a color decomposition means decomposing the illumination light into red, green and blue color lights, the prism unit being provided to correspond to each of the red, green, and blue color lights, the reflective image display device being provided to correspond to each of the red, green, and blue color lights; a color compositing means allowing the projection light of each color light from an associated reflective image display device to have a same optical axis; and a projection lens projecting the color-composited projection light on an object on which the projection light is to be projected.

Advantageous Effects of Invention

One or more embodiments of the present invention provide a prism unit and projector having a configuration capable of miniaturizing an optical system including a prism.

DETAILED DESCRIPTION

A prism unit and a projector according to one or more embodiments of the present invention will be described below with reference to the drawings. Note that in one or more embodiments described hereinafter, when numbers, amounts and the like are referred to, one or more embodiments the present invention is not necessarily limited in scope thereto unless otherwise indicated. Identical and corresponding components are identically denoted and may not be described redundantly. Furthermore, illumination light and projection light shown in the figures illustrate a principal ray.

A prism generally means a polyhedron using a transparent medium such as glass having a refractive index different than the surrounding space in order to disperse light, refract light, totally reflect light, and make light birefringent. However, in the following description, when a polyhedron which does not have such a property as a prism is used in combination with a polyhedron having a property as a prism to form a prism unit, and the prism unit will as a whole have a function as a prism, even the polyhedron which does not have a property as a prism will also be referred to as a prism. Furthermore, an angle of an optical surface in the following description is intended to mean an angle of inclination relative to a normal to a substrate 2 unless otherwise specified.

(Reflective Image Display Device)

Figure 1:
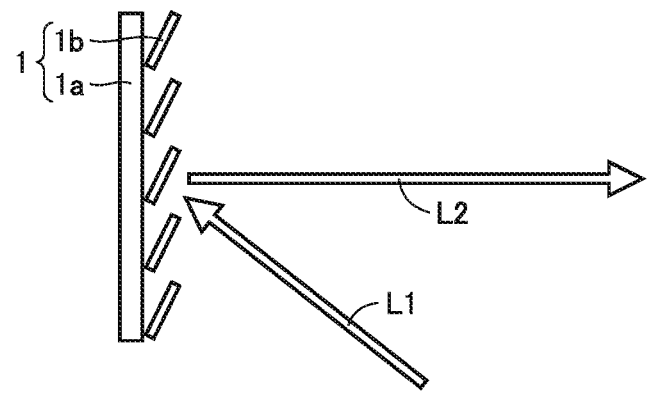
FIG. 1 is a schematic diagram according to one or more embodiments showing a state of illumination light and projection light when a reflective image display device is in an ON state as viewed from a lateral side.
Figure 2:
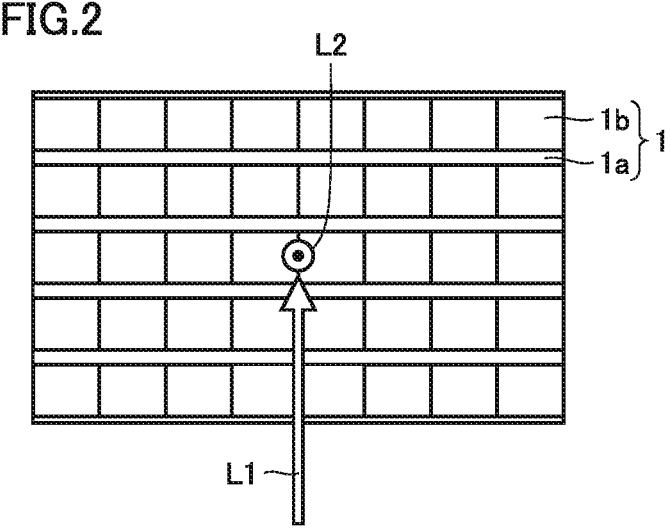
FIG. 2 is a schematic diagram according to one or more embodiments showing a state of illumination light and projection light when the reflective image display device is in the ON state as viewed from a front side.
Figure 3:
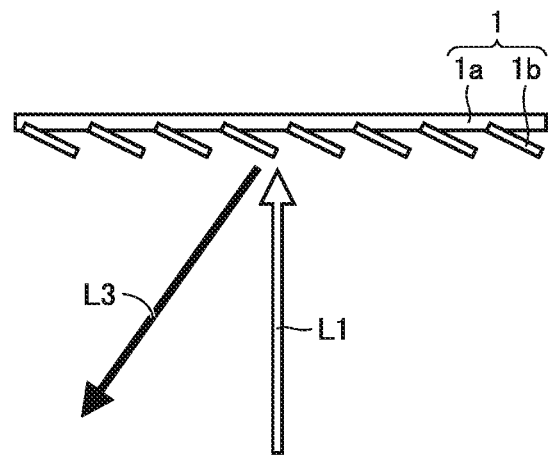
FIG. 3 is a schematic diagram according to one or more embodiments showing a state of illumination light and projection light when the reflective image display device is in an OFF state as viewed from a top side.
Figure 4:
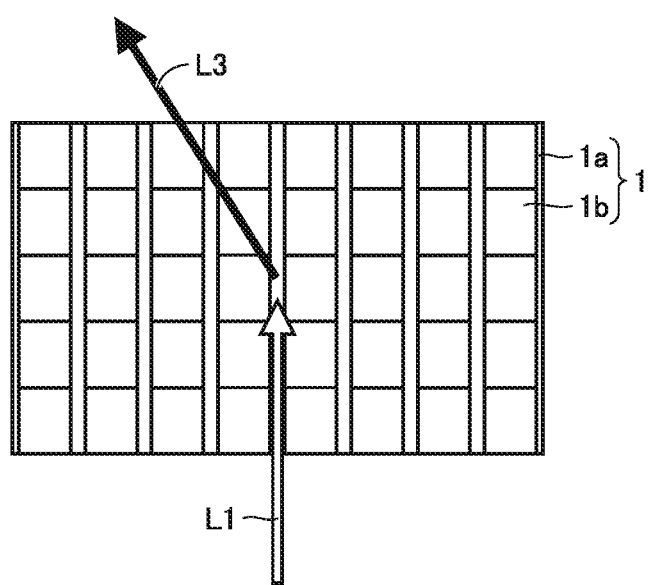
FIG. 4 is a schematic diagram according to one or more embodiments showing a state of illumination light and projection light when the reflective image display device is in the OFF state as viewed from a front side.

An operation of a reflective image display device 1 used in one or more embodiments will be described with reference to FIGS. 1 to 4. FIGS. 1 and 2 are schematic diagrams according to one or more embodiments showing states of illumination light and projection light when reflective image display device 1 is in an ON state as viewed from a lateral side and a front side, and FIGS. 3 and 4 are schematic diagrams according to one or more embodiments showing states of illumination light and projection light when reflective image display device 1 is in an OFF state as viewed from a top side and the front side. In the figures, the illumination light is denoted by L1 and the projection light is denoted by L2.

In one more embodiments as shown in FIGS. 1 and 2, reflective image display device 1 has, for example, a laterally elongate, rectangular display area having an aspect ratio of 16:10, with each pixel composed of a plurality of small mirrors 1b provided on a substrate 1a. When reflective image display device 1 is in the ON state (displays white), a normal to small mirror 1b is inclined toward a longer side of the display area, and illumination light L1 is incident obliquely from below and projection light L2 reflected by reflective image display device 1 travels perpendicular to the display surface and will enter a projection lens.

In one or more embodiments as shown in FIGS. 3 and 4, when reflective image display device 1 is in the OFF state (displays black), the mirror's normal is inclined toward a short side of the display area, and illumination light L1 reflected at a pixel travels obliquely upward and leftward as OFF light L3 and does not enter the projection lens.

(Conventional Prism Units 500, 600)

Figure 5:
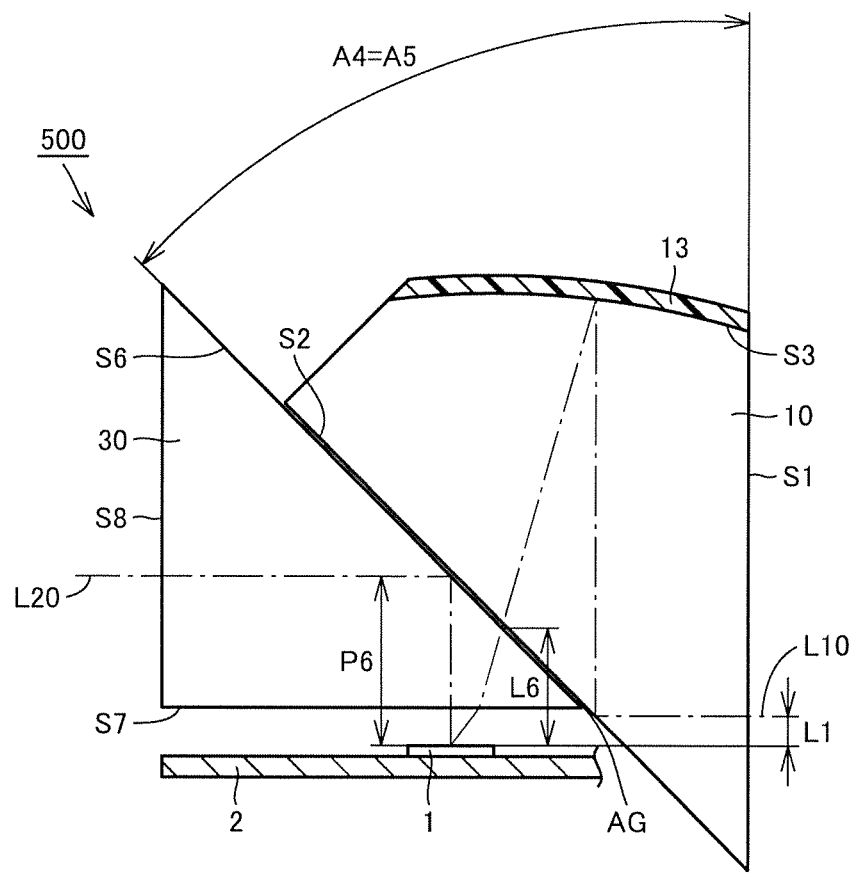
FIG. 5 is a first diagram showing a configuration of a conventional prism unit.
Figure 6:
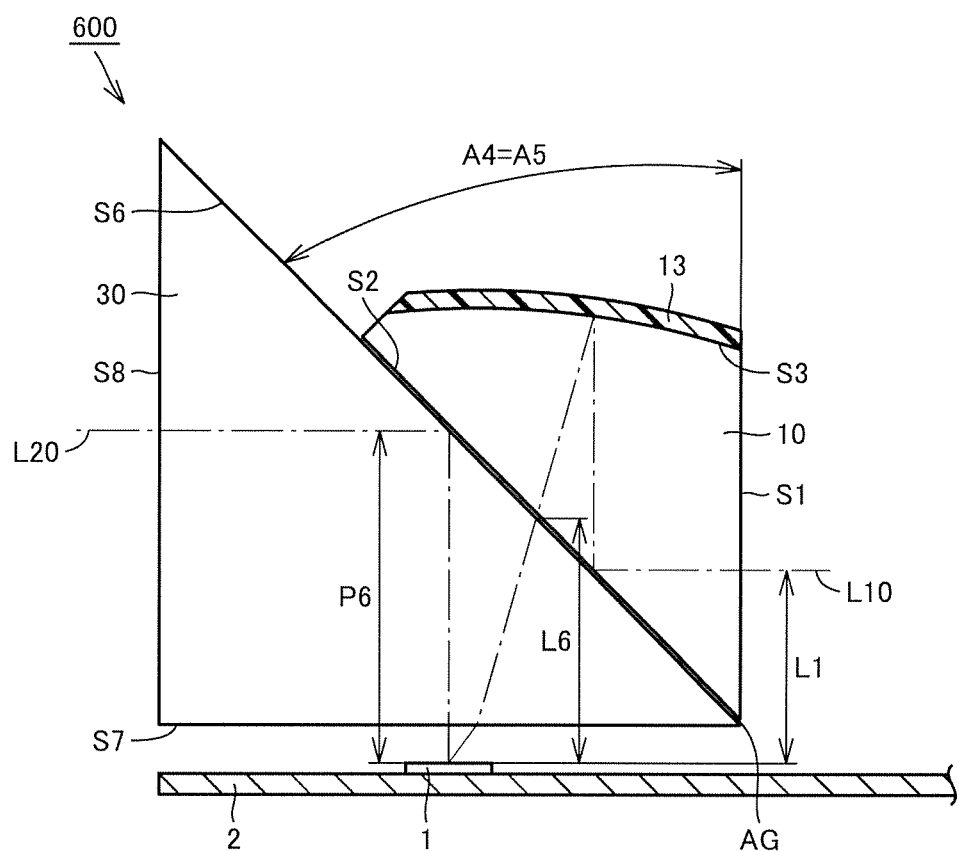
FIG. 6 is a second diagram showing a configuration of a conventional prism unit.

Reference will be made to FIG. 5 and FIG. 6 to describe configurations of conventional prism units. FIG. 5 and FIG. 6 are first and second diagrams showing the configurations of the conventional prism units.

With reference to FIG. 5, a conventional prism unit 500 will be described. Prism unit 500 receives and guides incident illumination light L10 to reflective image display device 1, which is provided on a substrate 2, to illuminate it and guides projection light L20, which is reflected by reflective image display device 1, to an externally provided projection lens 106 (see FIG. 7) and allows it to exit.

Prism unit 500 has a first prism 10 and a third prism 30. First prism 10 and third prism 30 are each a polyhedron having a columnar shape extending in a direction perpendicular to the plane of the sheet of the figure. First prism 10 includes a first optical surface S1 allowing illumination light L10 to enter the prism, a second optical surface S2 totally reflecting illumination light L10 having entered through first optical surface S1, and a third optical surface S3 allowing illumination light L10 totally reflected by second optical surface S2 to exit the prism. Third optical surface S3 is provided with a reflective film 13. Reflective film 13 has a function to reflect illumination light L10 that has exited third optical surface S3 with an angular difference to allow illumination light L10 to again enter third optical surface S3 so as to allow illumination light L10 to be transmitted through second optical surface S2 and thus exit.

Third prism 30 includes a sixth optical surface S6 forming an air gap AG with second optical surface S2 and allowing illumination light L10 having exited through second optical surface S2 to enter the prism, a seventh optical surface S7 allowing illumination light L10 having entered through sixth optical surface S6 to exit the prism, and an eighth optical surface S8 allowing projection light L20 to exit the prism, projection light L20 being illumination light L10 exiting through seventh optical surface S7, incident on and reflected by externally provided reflective image display device 1, entering the prism through seventh optical surface S7, and totally reflected by sixth optical surface S6.

In this manner, prism unit 500 is composed of two prisms, i.e., first prism 10 and third prism 30. Herein, a distance between an intersection of a principal ray of illumination light L10 and first optical surface S1 and a surface of reflective image display device 1 is represented as L1, a distance between an intersection of the principal ray of illumination light L10 and sixth optical surface S6 and the surface of reflective image display device 1 is represented as L6, and a distance between an intersection of a principal ray of projection light L20 reflected by reflective image display device 1 and sixth optical surface S6 and the surface of reflective image display device 1 is represented as P6.

In this prism unit 500, a tip of first prism 10 has a large portion located on reflective image display device 1 side, and accordingly, a design is required to avoid interference between the prism unit and other optical members and reflective image display device 1 and substrate 2.

With reference to FIG. 6, prism unit 600 has the same basic configuration as prism unit 500, except that a tip of first prism 10 is substantially at the same position as a tip of third prism 30. Even with this configuration, the principal ray of the projection light L20 is distant from substrate 2, resulting in inviting an increase in size of third prism 30.

(First Example of One or More Embodiments: Projector 1000, Prism Unit 100)

Figure 7:
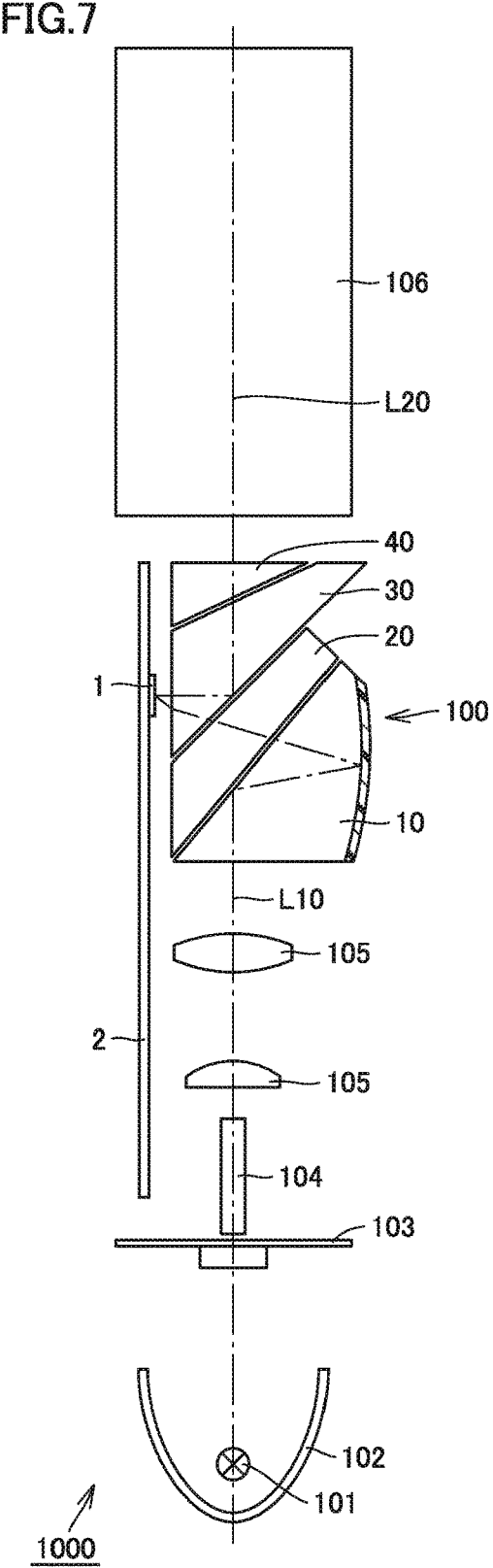
FIG. 7 is a side view showing an overall configuration of a projector including a prism unit according to one or more embodiments.
Figure 8:
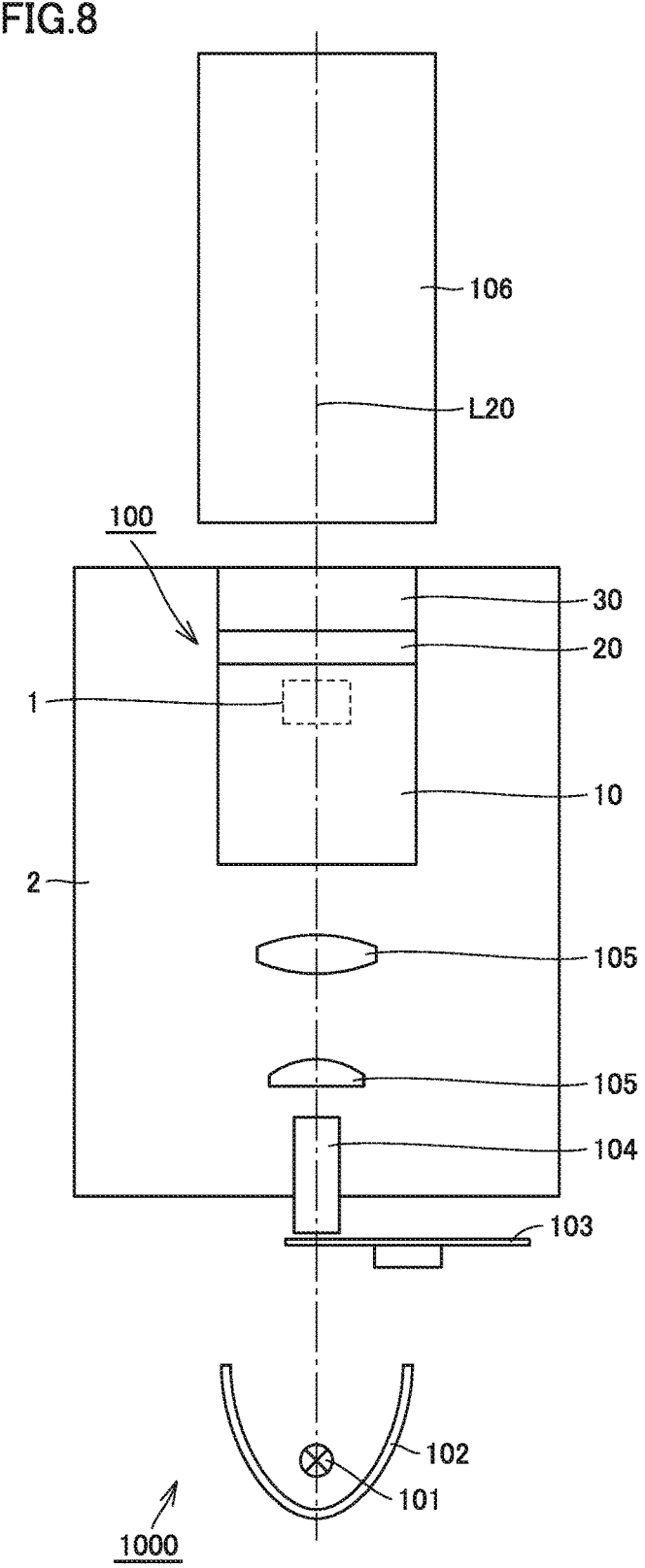
FIG. 8 is a top view showing the overall configuration of the projector including the prism unit according to one or more embodiments.
Figure 9:
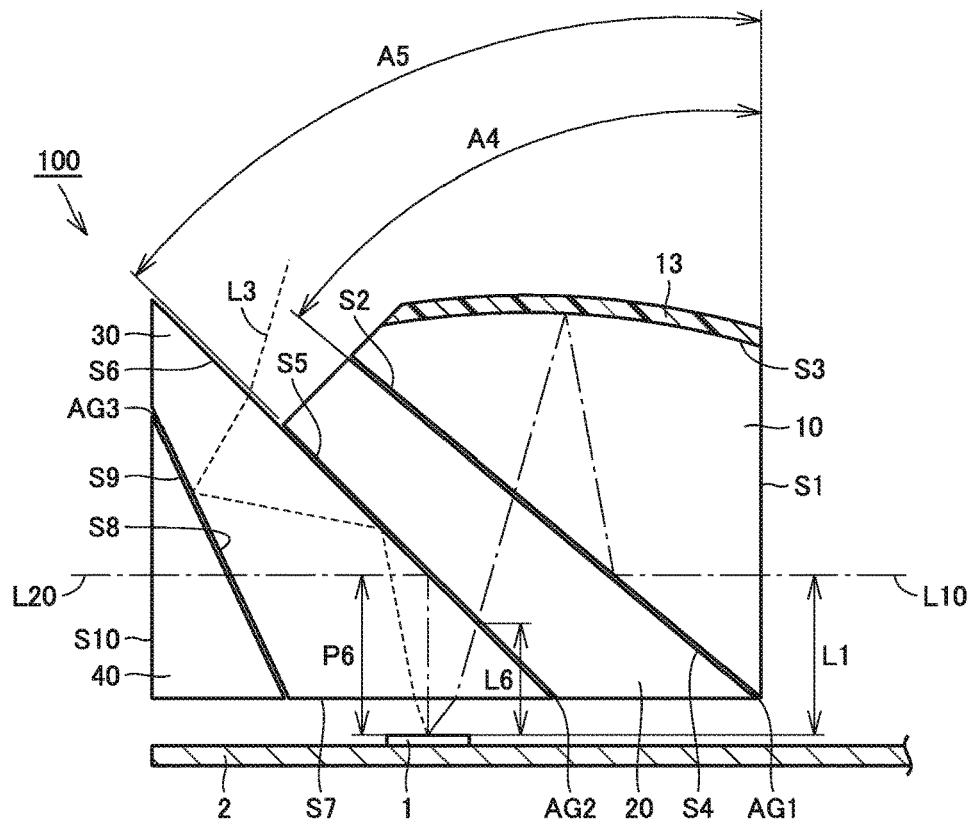
FIG. 9 is a side view showing a configuration of a prism unit according to one or more embodiments.

With reference to FIG. 7 to FIG. 9, a projector 1000 and a prism unit 100 in the first example of one or more embodiments will be described. FIGS. 7 and 8 are a side view and a top view, respectively, showing an overall configuration of projector 1000 including prism unit 100, and FIG. 9 is a side view showing a configuration of prism unit 100.

In one or more embodiments as shown in FIG. 7 and FIG. 8, projector 1000 includes a light source 101, a lamp reflector 102, a color wheel 103, a rod integrator 104, a relaying optical means 105, prism unit 100, a projection lens 106, and reflective image display device 1 provided on substrate 2.

For light source 101, a discharge lamp emitting white light is used. Lamp reflector 102 is composed of an ellipsoidal surface and as light source 101 is placed at a focal position thereof, a light beam from the light source exits as convergent light.

Illumination light L10 from light source 101 is incident on color wheel 103. Color wheel 103 is composed of a color filter which transmits R (red color), G (green color), and B (blue color). By rotating color wheel 103, illumination light L10 has color light sequentially switched over time, and image information corresponding to each color is displayed on reflective image display device 1. This can colorize a projected image.

Illumination light L10 having passed through color wheel 103 enters rod integrator 104 made of glass in the form of an elongate quadrangular prism having a rectangular cross section. Illumination light L10 having entered through an incident surface of rod integrator 104 is repeatedly totally reflected on a wall surface and mixed, and has a homogeneous energy distribution at the exit surface.

Behind rod integrator 104 are disposed relaying optical means 105, prism unit 100 and reflective image display device 1, and light having exited rod integrator 104 passes through relaying optical means 105 and prism unit 100 and thus illuminates reflective image display device 1.

Relaying optical means 105 cooperates with prism unit 100 to form uniform illumination for projecting an image of the exit surface of rod integrator 104 on a display surface of reflective image display device 1. That is, the exit surface of rod integrator 104 is conjugate with the display surface of reflective image display device 1, and by making the shape of the exit surface of rod integrator 104 substantially similar to the display area of reflective image display device 1, efficient illumination can be provided.

Illumination light L10 having entered prism unit 100 is guided to reflective image display device 1 and illuminates it, and the light is reflected by reflective image display device 1, again enters prism unit 100, and is guided to projection lens 106, and an image is displayed on a screen.

Of light reflected from reflective image display device 1 illuminated, ON light from reflective image display device 1 in the ON state enters projection lens 106 and is projected on the screen. OFF light of reflective image display device 1 in the OFF state does not enter projection lens 106, and no image is projected on the screen.

(Prism Unit 100)

A specific configuration of prism unit 100 of one or more embodiments will be described with reference to FIG. 9. Prism unit 100 is a prism unit which guides incident illumination light L10 to reflective image display device 1 to illuminate it and guides projection light L20, which is reflected by reflective image display device 1, to an externally provided projection lens and allows it to exit.

Prism unit 100 includes a first prism 10, a reflecting means 13, a second prism 20, a third prism 30, and a fourth prism 40. First prism 10, second prism 20, third prism 30, and fourth prism 40 are each a polyhedron having a columnar shape extending in a direction perpendicular to the plane of the sheet of the figure.

First prism 10 includes first optical surface S1 allowing illumination light L10 to enter the prism, second optical surface S2 totally reflecting illumination light L10 having entered through first optical surface S1, and third optical surface S3 allowing illumination light L10 totally reflected by second optical surface S2 to exit the prism. For first prism 10, a glass material such as BK 7 having a refractive index of about 1.52 is used.

Third optical surface S3 is a convex curved surface bulging outward. Third optical surface S3 is provided with a reflective film as a reflecting means 13. Reflective film 13 has a function to reflect illumination light L10 that has exited third optical surface S3 with an angular difference to allow illumination light L10 to again enter third optical surface S3 so as to allow illumination light L10 to be transmitted through second optical surface S2 and thus exit.

By making third optical surface S3 an outwardly bulging convex curved surface, a cross section of an illumination light beam passing through first optical surface S1 can be reduced, and the prism unit and the illumination system can be compact. Furthermore, by using a reflective film as reflecting means 13, the number of parts required for the prism unit can be reduced. Furthermore, the prism unit's height can also be reduced.

Second prism 20 includes a fourth optical surface S4 forming a first air gap AG1 with second optical surface S2 and allowing illumination light L10 having exited through second optical surface S2 to enter the prism, and a fifth optical surface S5 allowing illumination light L10 having entered through fourth optical surface S4 to exit the prism.

For second prism 20, a glass material such as BK 7 having a refractive index of about 1.52 is used.

Third prism 30 includes a sixth optical surface S6 forming a second air gap AG2 with fifth optical surface S5 and allowing illumination light L10 having exited through fifth optical surface S5 to enter the prism, a seventh optical surface S7 allowing illumination light L10 having entered through sixth optical surface S6 to exit the prism, and an eighth optical surface S8 allowing projection light L20 to exit the prism, projection light L20 being illumination light L10 exiting through seventh optical surface S7, incident on and reflected by externally provided reflective image display device 1, entering the prism through seventh optical surface S7, and totally reflected by sixth optical surface S6. For third prism 30, a glass material such as N-KZFS 8, N-LAK 8, N-LAF 35 and the like manufactured by Schoot AG with a refractive index of around 1.72 is used.

Fourth prism 40 includes a ninth optical surface S9 forming a third air gap AG3 with eighth optical surface S8 and allowing projection light L20 having exited through eighth optical surface S8 to enter the prism, and a tenth optical surface S10 allowing projection light L20 having entered through ninth optical surface S9 to exit the prism. For fourth prism 40, the same glass material as third prism 30 is used.

Illumination light L10 from relaying optical means 105 enters first prism 10 through first optical surface S1 and is thereafter incident on second optical surface S2 facing first air gap AG1 at a reference incident angle of 50 degrees and is totally reflected, and travels toward third optical surface S3.

Third optical surface S3 is a concave reflecting surface when viewed from inside the prism, and illumination light L10 is here reflected in a substantially telecentric light beam state. Illumination light L10 reflected by third optical surface S3 is incident on second optical surface S2 at a reference incident angle of 24.8 degrees, which does not cause total reflection, and is transmitted therethrough, and enters second prism 20 through fourth optical surface S4.

Illumination light L10 having entered second prism 20 is incident on fifth optical surface S5 facing second air gap AG2 at a reference incident angle of 29.8 degrees, which does not cause total reflection, and is transmitted therethrough, and passes through air gap AG2 and thus enters third prism 30 through sixth optical surface S6.

Illumination light L10 having entered third prism 30 exits it through seventh optical surface S7 and illuminates reflective image display device 1. Illumination light L10 reflected by reflective image display device 1 in the ON state again enters third prism 30 as projection light through seventh optical surface S7.

Projection light L20 having entered through seventh optical surface S7 is incident on sixth optical surface S6 facing second air gap AG2 at a reference incident angle of 45 degrees and is totally reflected, and travels toward eighth optical surface S8. Projection light L20 totally reflected by sixth optical surface S6 is incident on eighth optical surface S8 facing third air gap AG3 at a reference incident angle of 25.5 degrees and is transmitted therethrough, and passes through air gap AG3 and thus enters fourth prism 40 through ninth optical surface S9. Projection light L20 having entered fourth prism 40 through ninth optical surface S9 exits the prism through tenth optical surface S10, and enters projection lens 106 and is projected on the screen.

Illumination light reflected by reflective image display device 1 in the OFF state again enters third prism 30 as OFF light L3 through seventh optical surface S7. OFF light L3 having entered through seventh optical surface S7 is totally reflected by sixth optical surface S6 facing second air gap AG2 and travels toward eighth optical surface S8. OFF light L3 totally reflected by sixth optical surface S6 is incident on eighth optical surface S8 facing third air gap AG3 at a reference incident angle of 47.2 degrees and is totally reflected, and OFF light L3 is thus completely separated from the projection light.

Thus OFF light L3 does not enter projection lens 106, and thus does not act as stray light in the projection lens and does not invite reduction in contrast. Furthermore, as OFF light L3 does not enter projection lens 106, an increase in temperature otherwise caused as the light impinges on the lens barrel of projection lens 106 and the like can also be prevented.

In FIG. 9, a distance between an intersection of a principal ray of illumination light L10 and first optical surface S1 and a surface of reflective image display device 1 is represented as L1, a distance between an intersection of the principal ray of illumination light L10 and sixth optical surface S6 and the surface of reflective image display device 1 is represented as L6, and a distance between an intersection of a principal ray of projection light L20 reflected by reflective image display device 1 and sixth optical surface S6 and the surface of reflective image display device 1 is represented as P6.

Note that conventional prism unit 500 shown in FIG. 5 and prism unit 600 shown in FIG. 6 are not provided with second prism 20 as shown in one or more embodiments. In this case, if the condition is satisfied that illumination light entering first prism 10 is totally reflected on second optical surface S2 and exiting illumination light is not totally reflected, L1 is smaller than L6.

Furthermore, in prism unit 500 and prism unit 600, a difference |P6−L1| between projection light L20 and illumination light L10 is larger than |P6−L6|. Furthermore, in the case of the configuration of prism unit 500, illumination light L10 approaches reflective image display device 1 and first prism 10 approaches reflective image display device 1, and substrate 2, and first prism 10 and relaying optical means 105 interfere with each other. In prism unit 600, as illumination light L10 is distant from substrate 2, projection light L20 is also distant from substrate 2, resulting in third prism 30 increased in size.

In the case of the first example of one or more embodiments, by providing second prism 20, a relationship of |P6−L1|≤|P6−L6| can be comprised. This can suppress an increase in height of the prism unit attributed to a difference in level between the optical axis of illumination light L10 and that of projection light L20, thereby miniaturizing an optical system including the prism.

Furthermore, second prism 20 can have a total reflection surface on which illumination light is reflected spaced from a total reflection surface on which projection light is reflected, which allows the projection light's optical axis and the illumination light's optical axis to be close to or match each other in level. Furthermore, reflective image display device 1 and substrate 2 for driving it can be disposed without interfering with the prisms and the illumination system.

Thus providing the second prism also facilitates disposing substrate 2, and furthermore, can prevent third prism 30 from having a large size. As a result, a lightweight, inexpensive prism unit 100 can be manufactured, and hence a lightweight, inexpensive, thin and compact projector can also be manufactured.

Furthermore, referring to FIG. 9, first optical surface S1 and fourth optical surface S4 form an angle A4, and first optical surface S1 and fifth optical surface S5 form an angle A5 for the sake of illustration. In the case of prism unit 500 shown in FIG. 5 in which second prism 20 is not provided, an angle corresponding to A4 and A5 is 45 degrees, and illumination light L10 is required to be incident at a reference incident angle of 45 degrees and also totally reflected.

In the case of prism unit 100 of the first example of one or more embodiments, A4=50 degrees while reflection angle A5 of the projection light's optical axis is maintained to be equal to 45 degrees, so that an angle formed by second optical surface S2 and an optical axis of a relay optical system (illumination light L10) can be set to be as large as 50 degrees, rather than 45 degrees.

By thus making second prism 20 in the form of a wedge, an angle of incidence when illumination light reflected by third optical surface S3 passes through second optical surface S2 and fourth optical surface S40 is reduced to be small and transmission efficiency is improved. Furthermore, an angle of incidence when illumination light having entered through first optical surface S1 is reflected by second optical surface S2 is increased, which facilitates total reflection, and increases a degree of freedom in designing the illuminating optical system and selecting a glass material for first prism 10 and second prism 20.

For example, even when a glass material having a lower refractive index, such as BK 7, is used, sufficient total reflection can be provided. The glass material having a lower refractive index, such as BK 7, has a small reduction in transmittance in the blue color region, and has a higher transmittance, a small specific gravity, and a low price, and by making an angle of incidence on second optical surface S2 relatively large, light utilization efficiency is improved.

Furthermore, an angle of illumination light L10 incident on second optical surface S2 from third optical surface S3 is 29.8 degrees for A4=A5=45 degrees, whereas, as in the first example of one or more embodiments, A4>A5=50 degrees allows the angle to be as small as 24.8 degrees, and a reflectance at an interface can be reduced and better transmission efficiency is effectively obtained.

In addition, a refractive index N1 of first prism 10 may be smaller than a refractive index N3 of third prism 30. By using a glass material of a high refractive index for third prism 30, sixth optical surface S6 of third prism 30 can be configured to have an angle of 45 degrees relative to the image display surface of reflective image display device 1, reflective image display device 1 and substrate 2 thereof can be disposed parallel to the optical axis of the projection light, and the projector's height can be suppressed.

A material having a high refractive index tends to have a low transmittance in the blue color region, in particular, and using for first prism 10 and second prism 20 a glass material such as BK 7 having a low refractive index but a good transmittance can suppress reduction in transmittance, in the blue color region in particular. In addition, BK 7 is relatively lightweight and inexpensive, and can thus contribute to the prism unit's weight and price reduction.

(Second Example of One or More Embodiments: Prism Unit 100A)

Figure 10:
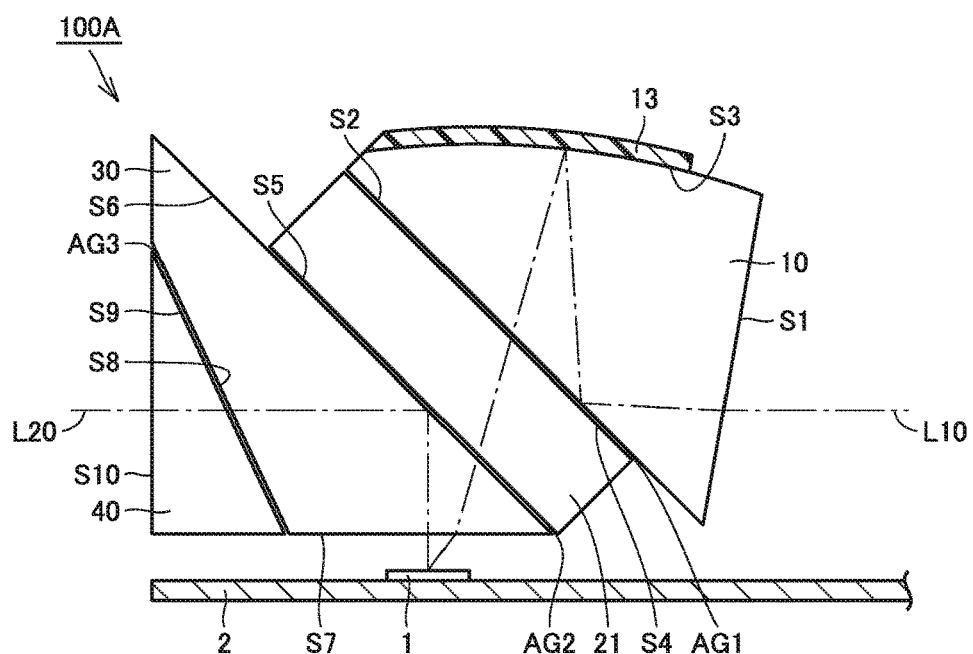
FIG. 10 is a side view showing a configuration of a prism unit according to one or more embodiments.

With reference to FIG. 10, a prism unit 100A in the second example of one or more embodiments will be described. FIG. 10 is a side view showing a configuration of prism unit 100A. It is different from prism unit 100 in that second prism 21 is formed of a parallel flat plate and that first optical surface S1 is not perpendicular to the optical axis of illumination light L10. The remainder in configuration is the same as that of prism unit 100 of the first example of one or more embodiments described above. Accordingly, redundant description will not be repeated.

Thus using a parallel flat plate prism as second prism 21 also allows a function and effect similar to that in the first example of one or more embodiments to be obtained. Furthermore, using a parallel flat plate prism as second prism 21 effectively reduces a cost required for manufacturing second prism 21. First optical surface S1 is inclined in a direction to increase an angle of incidence on second optical surface S2 of illumination light L10 having entered through first optical surface S1, and a reference angle of incidence on second optical surface S2 of illumination light L10 having entered through first optical surface S1 is larger than 45 degrees, which further ensures that total reflection is effectively obtained.

(Third Example of One or More Embodiments: Prism Unit 100B)

Figure 11:
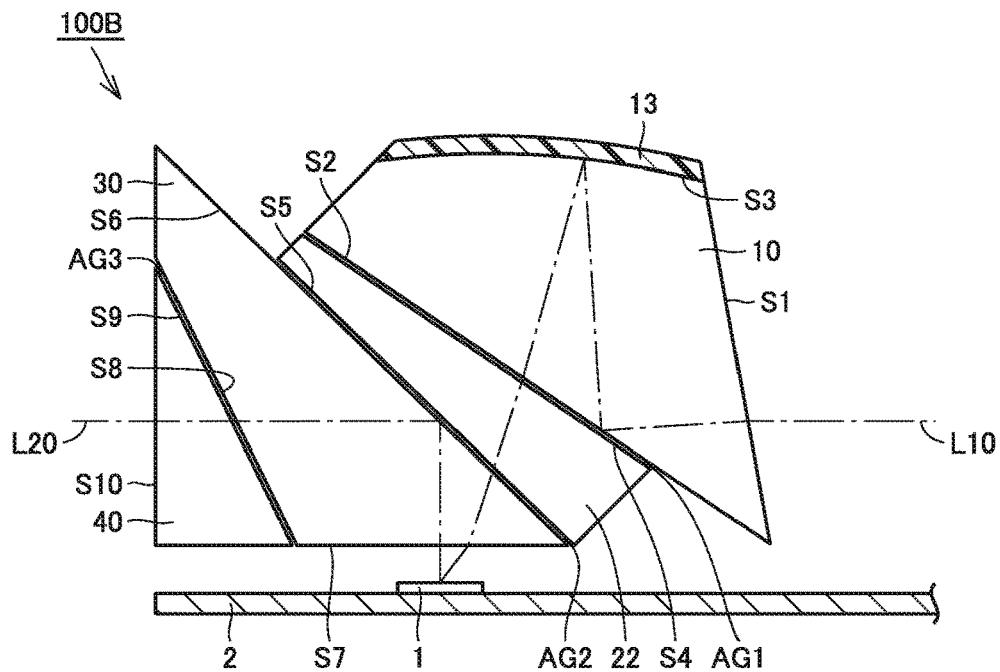
FIG. 11 is a side view showing a configuration of a prism unit according to one or more embodiments.

With reference to FIG. 11, a prism unit 100B in the third example of one or more embodiments will be described. FIG. 11 is a side view showing a configuration of prism unit 100B. Prism unit 100B is different from prism unit 100 in that second prism 22 has fourth optical surface S4 more inclined, and that first optical surface S1 is inclined in an opposite direction as compared with the case of prism unit 100A, i.e., first optical surface S1 has an upper side closer to second prism 20 than a lower side.

Such a configuration can also provide a function and effect similar to that in the first example of one or more embodiments described above. Furthermore, fourth optical surface S4 has an angle as large as 55 degrees relative to the optical axis of illumination light L10, and a condition for total reflection can be sufficiently satisfied even when first optical surface S1 is inclined in a direction to reduce an angle of incidence on second optical surface S2 of illumination light L10 having entered through first optical surface S1. Furthermore, illumination light L10 incident on second optical surface S2 from third optical surface S3 has a small incident angle with a reference incident angle of about 20 degrees with respect to second optical surface S2, and can thus be transmitted with reduced reflection loss.

Furthermore, first optical surface S1 is formed to be along illumination light L10 reflected by second optical surface S2, that is, along an effective optical path region, and first prism 10 has little wasteful area or volume without an optical path, and can also be effectively reduced in weight.

(Fourth Example of One or More Embodiments: Prism Unit 100C)

Figure 12:
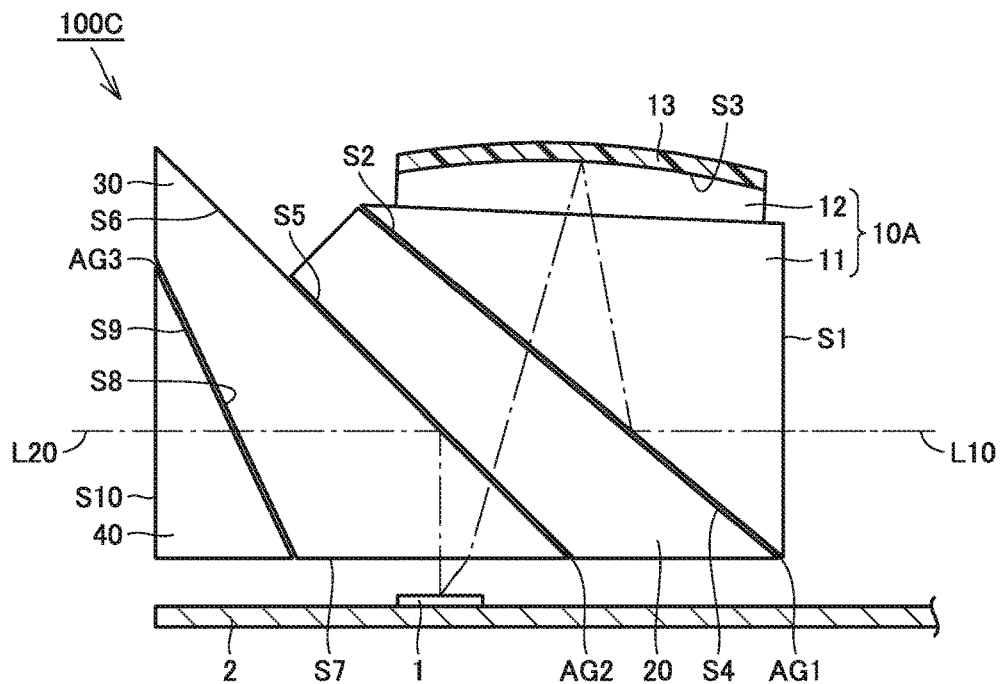
FIG. 12 is a side view showing a configuration of a prism unit according to one or more embodiments.

With reference to FIG. 12, a prism unit 100C in the fourth example of one or more embodiments will be described. FIG. 12 is a side view showing a configuration of prism unit 100C. Prism unit 100C is different from prism unit 100 in that a first prism 10A is composed of a prism 11 and a lens 12 joined together. The remainder in configuration is the same as that of prism unit 100 of the first example of one or more embodiments described above. Accordingly, redundant description will not be repeated.

Such a configuration can also provide a function and effect similar to that in the first example of one or more embodiments described above. Furthermore, by composing first prism 10A of discrete members, i.e., a prism having a flat surface and a lens having a curved surface, first prism 10A can be manufactured with a reduced cost.

(Fifth Example of One or More Embodiments: Prism Unit 100D)

Figure 13:
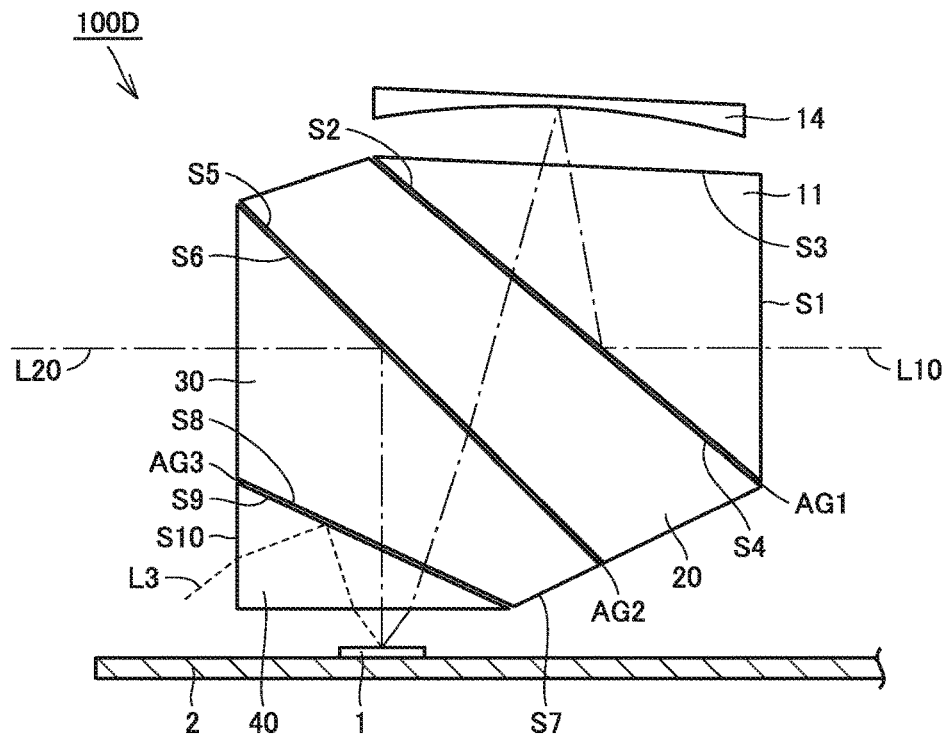
FIG. 13 is a side view showing a configuration of a prism unit according to one or more embodiments.

With reference to FIG. 13, a prism unit 100D in the fifth example of one or more embodiments will be described. FIG. 13 is a side view showing a configuration of prism unit 100D. Prism unit 100D is different from prism unit 100 in that fourth prism 40 for cutting OFF light is provided on a side of third prism 30 opposite to reflective image display device 1 rather than the projection lens, and that the prism unit has reflecting means 13 that is not a reflective coating provided on third optical surface S3 of first prism 11 but a concave mirror 14 facing third optical surface S3. The remainder in configuration is the same as that of prism unit 100 of the first example of one or more embodiments described above. Accordingly, redundant description will not be repeated.

Such a configuration can also provide a function and effect similar to that in the first example of one or more embodiments described above. Although providing fourth prism 40 on the side of third prism 30 opposite to reflective image display device 1 increases distance P6 between the optical axis of projection light L20 and reflective image display device 1, doing so can reduce prism unit 100D in volume. Furthermore, by making concave mirror 14 serving as a reflecting means of prism unit 100D discrete from first prism 11, concave mirror 14 as the reflecting means can be used for adjusting an area of reflective image display device 1 to be illuminated.

(Sixth Example of One or More Embodiments: Prism Unit 100E)

Figure 14:
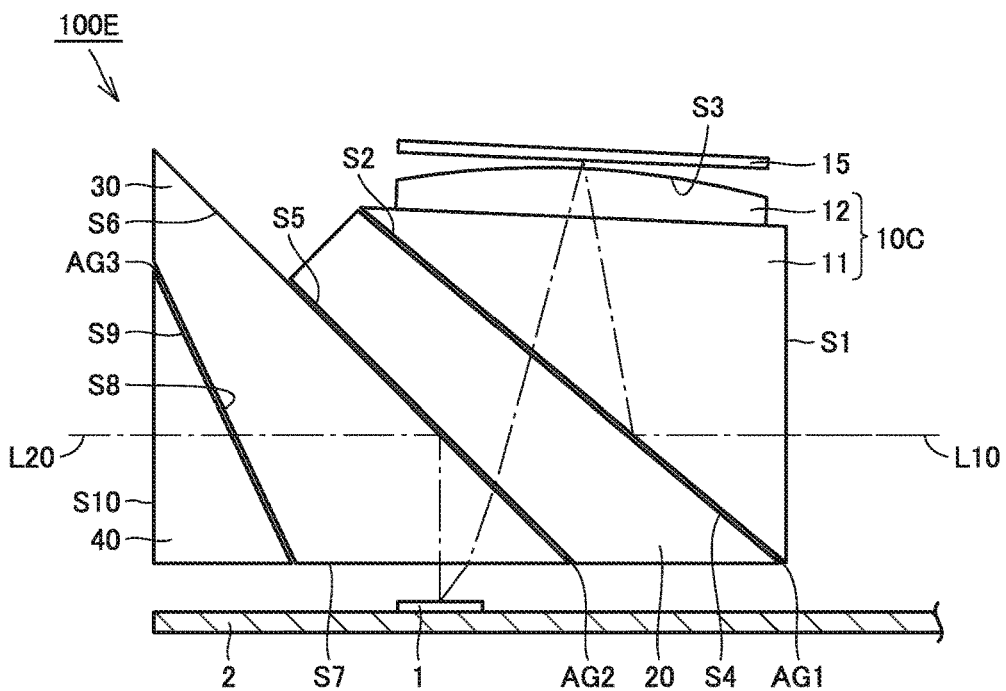
FIG. 14 is a side view showing a configuration of a prism unit according to one or more embodiments.

With reference to FIG. 14, a prism unit 100E in the sixth example of one or more embodiments will be described. FIG. 14 is a side view showing a configuration of prism unit 100E. A first prism 10C used in prism unit 100E is the same as first prism 10A shown in prism unit 100C of the fourth example of one or more embodiments in that prism 11 and lens 12 joined together are used. However, prism unit 100E is different in that it has reflecting means 13 which is not a reflective coating provided on lens 12 but a plane mirror 15 facing a curved surface of lens 12. The remainder in configuration is the same as that of prism unit 100 of the first example of one or more embodiments described above. Accordingly, redundant description will not be repeated. Such a configuration can also provide a function and effect similar to that in the fourth example of one or more embodiments described above.

(Seventh Example of One or More Embodiments: Projector 2000)

Figure 15:
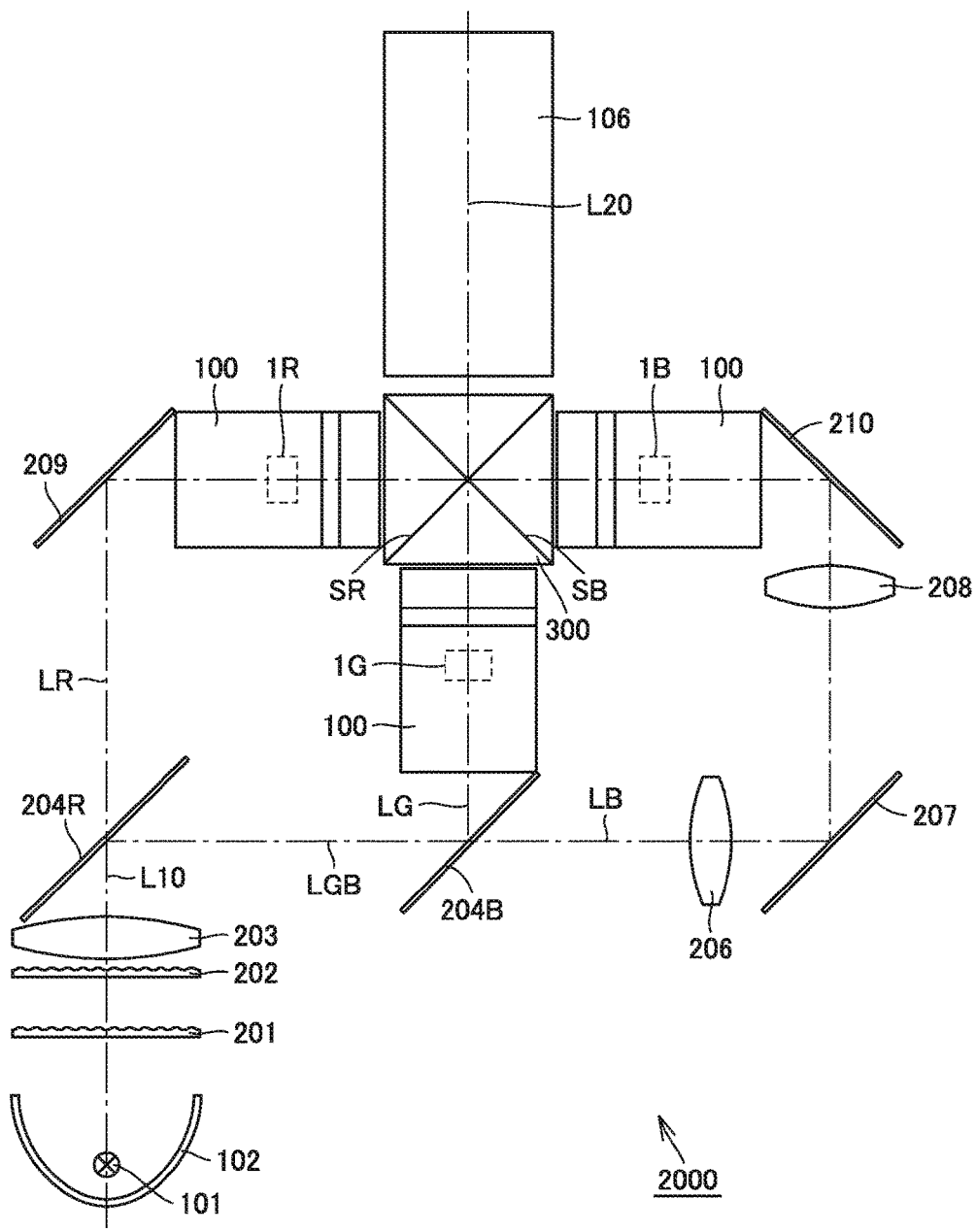
FIG. 15 is a side view showing an overall configuration of a projector according to one or more embodiments.

With reference to FIG. 15, a three-panel type projector 2000 using three reflective image display devices for red, green, and blue colors will be described. In the seventh example of one or more embodiments, a case will be described in which as the prism unit, prism unit 100 described in the first example of one or more embodiments is used.

In projector 2000, a discharge lamp that emits white light is used as light source 101, and lamp reflector 102 is composed of a parabolic surface, and as light source 101 is placed at a focal position thereof, a light beam from the light source exits as substantially collimated light.

The collimated light beam (illumination light L10) from light source 101 passes through a first lens array 201, a second lens array 202, and a superimposing lens 203, and is decomposed by a color decomposition system into red, green, and blue colors, which enter prism units, respectively, and illuminate reflective image display devices 1 (1R, 1G, 1B). Each prism unit 100 has a function and effect similar to that in the first example of one or more embodiments, and allows projection light L20 to exit with an optical axis substantially equal in level to incident illumination light L10.

First lens array 201 and second lens array 202 configure an integrator optical system, and first lens array 201 divides light into a large number of light beams via lens cells having a shape approximately similar to that of the display unit of reflective image display device 1, and collects the light beams to the corresponding lens cells of second lens array 202.

Each lens cell of second lens array 202 forms an image of a corresponding lens cell of first lens array 201 on a surface of reflective image display device 1 and by superimposing lens 203 the image of each lens cell is superimposed on reflective image display device 1, thereby achieving a uniform illuminance distribution on the surface of reflective image display device 1.

The color decomposition system is composed of dichroic mirrors 204R and 204B, turning mirrors 207, 209 and 210, and relay lenses 206 and 208, and divides illumination light L10 into three primary colors of red, green and blue and guides them to their associated reflective image display devices 1 (1G, 1B, 1R).

Illumination light L10 has green and blue colors reflected by dichroic mirror 204R transmitting red color and has red color transmitted therethrough, and the transmitted red illumination light LR proceeds via turning mirror 209 and prism unit 100 and illuminates a reflective image display device 1R for red color.

Dichroic mirror 204B transmits blue color and reflects green color, and the reflected green illumination light LG proceeds via prism unit 100 and illuminates a reflective image display device 1G for green color.

Blue illumination light LB follows an optical path having a different length before the light reaches a reflective image display device 1B for blue color, and accordingly, to create a condition equivalent to those for the other, red and green colors, a relaying optical system of an equal magnification system (relay lenses 206, 208) is disposed to illuminate reflective image display device 1B for blue color.

Reflective image display device 1R for red color, reflective image display device 1G for green color, and reflective image display device 1B for blue color each provide projection light, which passes through prism unit 100 and enters a cross dichroic prism 300. The projection light from reflective image display device 1R for red color is reflected by a red color reflecting surface SR of cross dichroic prism 300 and is transmitted through a blue color reflecting surface thereof. The projection light from reflective image display device 1G for green color is transmitted through both red color reflecting surface SR and blue color reflecting surface SB of cross dichroic prism 300. The projection light from reflective image display device 1B for blue color is reflected by blue color reflecting surface SB of cross dichroic prism 300 and is transmitted through the red color reflecting surface thereof.

In this manner, cross dichroic prism 300 composites exiting light from each of reflective image display device 1R for red color, reflective image display device 1G for green color and reflective image display device 1B for blue color coaxially to allow projection on a screen using a single projection lens 106. Color-composited projection light L20 is projected on the screen by projection lens 106.

In projector 2000 according to the seventh example of one or more embodiments, prism unit 100 is used for each color light and a color compositing system and a color decomposition system are separately provided, so that projector 2000 in the seventh example of one or more embodiments of a three-panel system can also have a height suppressed to be small.

(Eighth Example of One or More Embodiments: Projector 3000)

Figure 16:
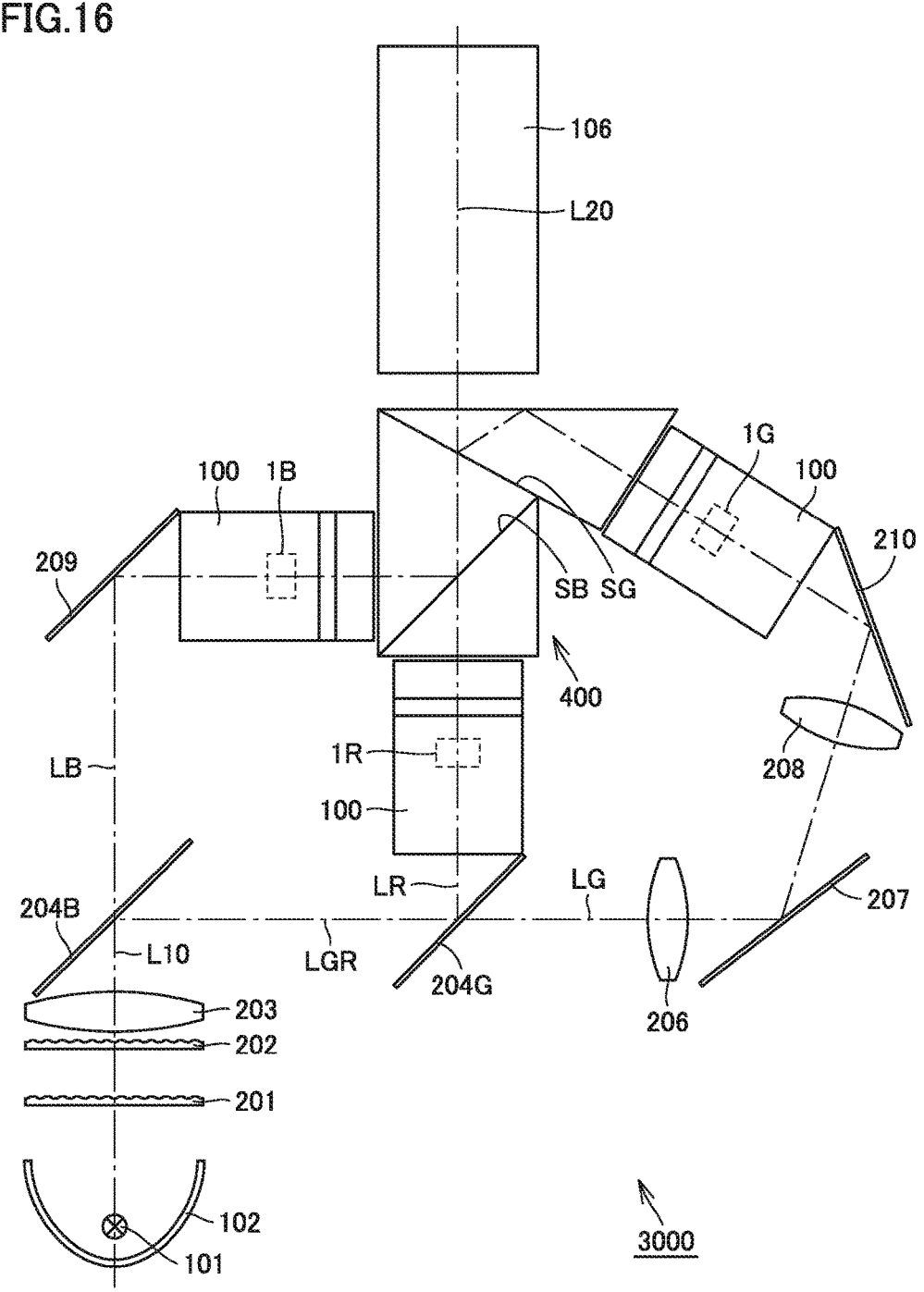
FIG. 16 is a side view showing an overall configuration of a projector according to one or more embodiments.

In one or more embodiments as shown in FIG. 16, a three-panel projector 3000 using three reflective image display devices for red, green, and blue colors will be described. Projector 3000 is identical to projector 2000 in a configuration from light source 101 up to superimposing lens 203, that is different in how a color compositing system is configured, and accordingly, redundant description will not be repeated.

In the color decomposition system, an initial, blue color transmitting dichroic mirror 204B reflects red and green colors and transmits blue color, and the transmitted blue illumination light LB proceeds via turning mirror 209 and through prism unit 100 and illuminates reflective image display device 1B for blue color.

A green color transmitting dichroic mirror 204G transmits green color and reflects red color, and the reflected red illumination light LR passes through prism unit 100 and illuminates reflective image display device 1R for red color.

Green illumination light LG follows an optical path having a different length before the light reaches reflective image display device 1G for green color, and accordingly, to create a condition equivalent to those for the other, blue and red colors, a relaying optical system of an equal magnification system (relay lenses 206, 208, and turning mirrors 207, 210) is disposed to illuminate reflective image display device 1G for green color.

Reflective image display device 1B for blue color, reflective image display device 1R for red color, and reflective image display device 1G for green color each provide projection light, which passes through an associated one of prism units 100 and enters a color compositing prism 400. The projection light from reflective image display device 1B for blue color is reflected by blue color reflecting surface SB of color compositing prism 400 and transmitted through green color reflecting surface SG thereof. The projected light from reflective image display device 1R for red color is transmitted through both blue color reflecting surface SB and green color reflecting surface SG of color compositing prism 400. The projection light from reflective image display device 1G for green color is totally reflected within color compositing prism 400 and then reflected by green color reflecting surface SG.

In this manner, color compositing prism 400 composites exiting light from each of reflective image display device 1B for blue color, reflective image display device 1R for red color, and reflective image display device 1G for green color coaxially to allow projection on a screen using a single projection lens 106. Color-composited projection light L20 is projected on the screen by projection lens 106.

(Ninth Example of One or More Embodiments: Projector 4000)

Figure 17:
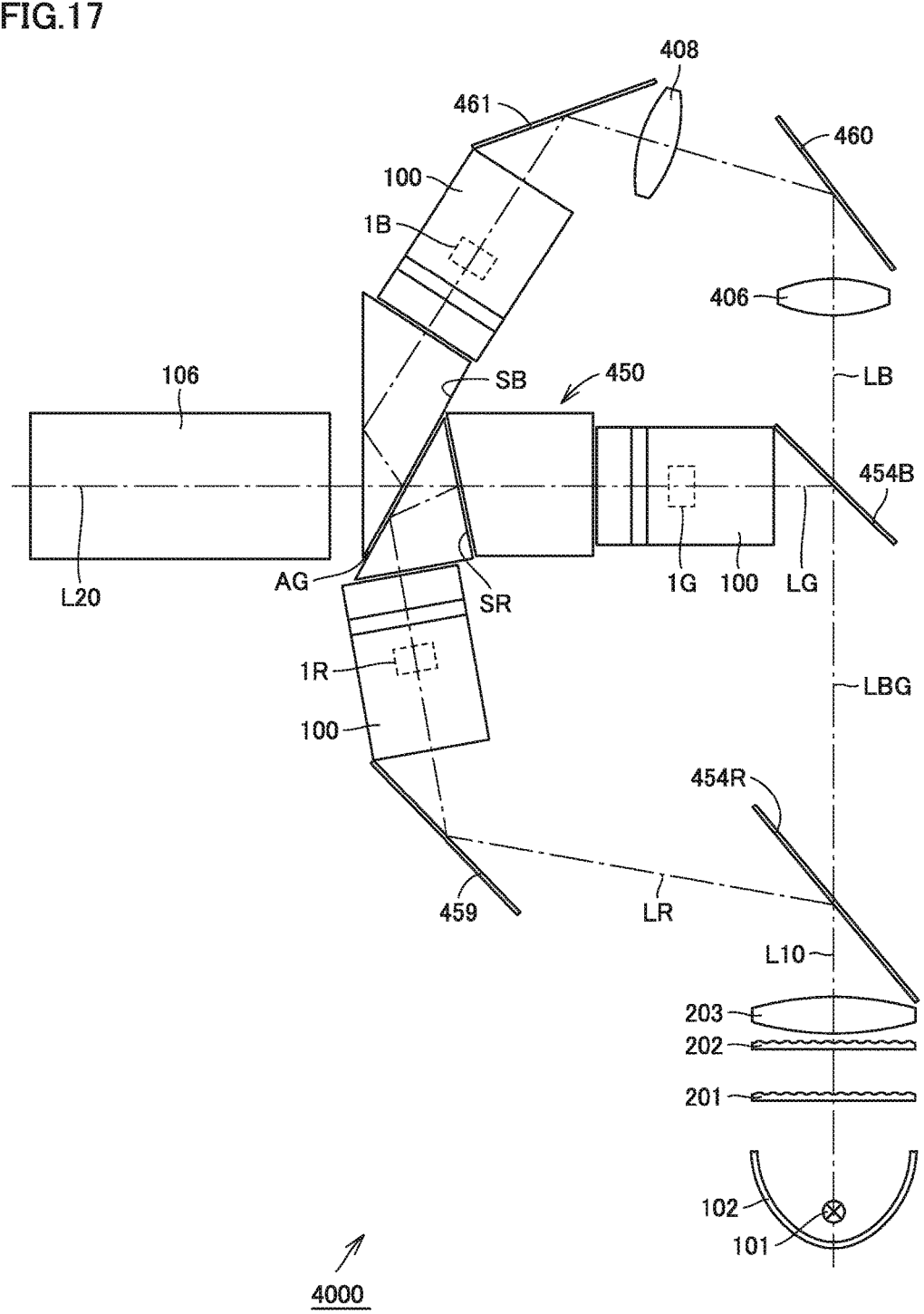
FIG. 17 is a side view showing an overall configuration of a projector according to one or more embodiments.

In one or more embodiments as shown in FIG. 17, a three-panel projector 4000 using three reflective image display devices for red, green, and blue colors will be described. Projector 4000 is identical to projector 2000 in a configuration from light source 101 up to superimposing lens 203, that is different in how a color compositing system is configured, and accordingly, redundant description will not be repeated.

In the color decomposition system, an initial, red color reflecting dichroic mirror 454R reflects red color and transmits blue and green colors, and the reflected red illumination light LR proceeds via a turning mirror 459 and through prism unit 100 and illuminates reflective image display device 1R for red color.

A blue color transmitting dichroic mirror 454B transmits blue color and reflects green color, and the reflected green illumination light LG proceeds through prism unit 100 and illuminates reflective image display device 1G for green color.

Blue illumination light LB follows an optical path having a different length before the light reaches reflective image display device 1B for blue color, and accordingly, to create a condition equivalent to those for the other, red and green colors, a relaying optical system of an equal magnification system (relay lenses 456, 458, and turning mirrors 460, 461) is disposed to illuminate reflective image display device 1B for blue color.

Reflective image display device 1R for red color, reflective image display device 1G for green color and reflective image display device 1B for blue color each provide projection light, which passes through an associated one of the prism units and enters a color compositing prism 450. The projection light from reflective image display device 1R for red color is totally reflected by an air gap surface AG of the color compositing prism, and subsequently reflected by red color reflecting surface SR and transmitted through blue color reflecting surface SB. The projected light from reflective image display device 1G for green color is transmitted through both red color reflecting surface SR and blue color reflecting surface BR of color compositing prism 400. The projection light from reflective image display device 1B for blue color is totally reflected within color compositing prism 450 and then reflected by blue color reflecting surface SB.

In this manner, color compositing prism 450 composites exiting light from each of reflective image display device 1R for red color, reflective image display device 1G for green color and reflective image display device 1B for blue color coaxially to allow projection on a screen using a single projection lens 106. Color-composited projection light L20 is projected on the screen by projection lens 106.

While projectors 2000, 3000, and 4000 described above have been described such that as a prism unit, prism unit 100 described in the first example of one or more embodiments is used, the prism unit is not limited to prism unit 100 and may be replaced with prism units 100A, 100B, 100C, 100D, or 100E described above.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: reflective image display device;
1B: reflective image display device for blue color;
1G: reflective image display device for green color;
1R: reflective image display device for red color;
2: substrate;
1a, 1b: small mirror;
10, 10A, 10C: first prism;
11: prism;
12: lens;
13: reflecting means (reflective film);
14: concave mirror;
15: flat mirror;
20, 21, 22: second prism;
30: third prism;
40: fourth prism;

100, 100A, 100B, 100C, 100D, 100E: prism unit;
101: light source;
102: lamp reflector;
103: color wheel;
104: rod integrator;
105: relaying optical means;
106: projection lens;
201: first lens array;
202: second lens array;
203: superimposing lens;
204B, 454B: blue color transmitting dichroic mirror;
204G: green color transmitting dichroic mirror;
204R, 454R: red color reflecting dichroic mirror;
206, 208, 406, 408: relay lens;
207, 209, 210, 459, 460, 461: turning mirror;
300: cross dichroic prism;
400, 450: color compositing prism;
1000, 2000, 3000, 4000: projector.

The invention claimed is:

1. A prism unit that guides incident illumination light to a reflective image display device to illuminate the reflective image display device, guides projection light, which is reflected by the reflective image display device, to an externally provided projection lens, and allows the projection light to exit the prism unit, the prism unit comprising:
   a first prism comprising:
      a first optical surface that allows the illumination light to enter the first prism,
      a second optical surface that reflects the illumination light—that entered through the first optical surface, and
      a third optical surface that allows the illumination light reflected by the second optical surface to exit the first prism;
   a reflecting means that reflects the illumination light that has exited the third optical surface with an angular difference so that the illumination light enters the third optical surface and is transmitted through the second optical surface to exit the first prism;
   a second prism comprising:
      a fourth optical surface that:
         forms a first air gap with the second optical surface, and
         allows the illumination light that exited through the second optical surface to enter the second prism, and
      a fifth optical surface that allows the illumination light that entered through the fourth optical surface to exit the second prism; and
   a third prism comprising:
      a sixth optical surface that:
         forms a second air gap with the fifth optical surface, and
         allows the illumination light that exited through the fifth optical surface to enter the third prism,
      a seventh optical surface that allows the illumination light that entered through the sixth optical surface to exit the third prism, and
      an eighth optical surface that allows projection light to exit the third prism, wherein
   the projection light is the illumination light that exits through the seventh optical surface, incident on and reflected by the reflective image display device, enters the third prism through the seventh optical surface, and is reflected by the sixth optical surface,
   the prism unit is disposed in a projector comprising:
      an illumination unit that generates the illumination light; and
      the reflective image display device disposed outside of and opposite to the seventh optical surface of the third prism unit, and
   a relationship of $|P6-L1| \leq |P6-L6|$ is satisfied, where:
      L1 is a distance between an intersection of a principal ray of the illumination light and the first optical surface and a surface of the reflective image display device,
      L6 is a distance between an intersection of the principal ray of the illumination light and the sixth optical surface and the surface of the reflective image display device, and
      P6 is a distance between an intersection of a principal ray of the projection light reflected by the reflective image display device and the sixth optical surface and the surface of the reflective image display device.

2. The prism unit according to claim 1, wherein the reflecting means is a reflective film disposed on the third optical surface.

3. The prism unit according to claim 1, wherein the third optical surface is a convex curved surface bulging outward.

4. The prism unit according to claim 1, wherein an angle formed by the first optical surface and the fourth optical surface is larger than an angle formed by the first optical surface and the fifth optical surface.

5. The prism unit according to claim 4, wherein a refractive index of the first prism is smaller than a refractive index of the third prism.

6. A projector comprising:
   an illumination unit that generates incident illumination light;
   a prism unit that guides the illumination light to a reflective image display device to illuminate the reflective image display device, guides projection light, which is reflected by the reflective image display device, to an externally provided projection lens, and allows the projection light to exit the prism unit, wherein the prism unit comprises:
      a first prism comprising:
         a first optical surface that allows the illumination light to enter the first prism,
         a second optical surface that reflects the illumination light—that entered through the first optical surface, and
         a third optical surface that allows the illumination light reflected by the second optical surface to exit the first prism;
      a reflecting means that reflects the illumination light that has exited the third optical surface with an angular difference so that the illumination light enters the third optical surface and is transmitted through the second optical surface to exit the first prism;
      a second prism comprising:
         a fourth optical surface that:
            forms a first air gap with the second optical surface, and
            allows the illumination light that exited through the second optical surface to enter the second prism, and
         a fifth optical surface that allows the illumination light that entered through the fourth optical surface to exit the second prism; and a third prism comprising:
  a sixth optical surface that:
    forms a second air gap with the fifth optical surface, and
    allows the illumination light that exited through the fifth optical surface to enter the third prism,
  a seventh optical surface that allows the illumination light that entered through the sixth optical surface to exit the third prism, and
  an eighth optical surface that allows projection light to exit the third prism; and
the reflective image display device disposed outside of and opposite to the seventh optical surface of the third prism unit, wherein
the projection light is the illumination light that exits through the seventh optical surface, incident on and reflected by the reflective image display device, enters the third prism through the seventh optical surface, and is reflected by the sixth optical surface, and
a relationship of $|P6-L1| \le |P6-L6|$ is satisfied, where:
  L1 is a distance between an intersection of a principal ray of the illumination light and the first optical surface and a surface of the reflective image display device,
  L6 is a distance between an intersection of the principal ray of the illumination light and the sixth optical surface and the surface of the reflective image display device, and
  P6 is a distance between an intersection of a principal ray of the projection light reflected by the reflective image display device and the sixth optical surface and the surface of the reflective image display device.

7. The projector according to claim 6, further comprising:
a color decomposition means that decomposes the illumination light into red, green and blue color lights, wherein
  the prism unit corresponds to each of the red, green, and blue color lights, and
  the reflective image display device corresponds to each of the red, green, and blue color lights;
a color compositing means that allows the projection light of each color light from an associated reflective image display device to have a same optical axis; and
a projection lens that projects the color-composited projection light on an object.

8. A prism unit that guides incident illumination light to a reflective image display device to illuminate the reflective image display device, guides projection light, which is reflected by the reflective image display device, to an externally provided projection lens, and allows the projection light to exit the prism unit, the prism unit comprising:
a first prism comprising:
  a first optical surface that allows the illumination light to enter the first prism,
  a second optical surface that reflects the illumination light—that entered through the first optical surface, and
  a third optical surface that allows the illumination light reflected by the second optical surface to exit the first prism;
a reflecting means that reflects the illumination light that has exited the third optical surface with an angular difference so that the illumination light enters the third optical surface and is transmitted through the second optical surface to exit the first prism;
a second prism comprising:
  a fourth optical surface that:
    forms a first air gap with the second optical surface, and
    allows the illumination light that exited through the second optical surface to enter the second prism, and
  a fifth optical surface that allows the illumination light that entered through the fourth optical surface to exit the second prism; and
a third prism comprising:
  a sixth optical surface that:
    forms a second air gap with the fifth optical surface, and
    allows the illumination light that exited through the fifth optical surface to enter the third prism,
  a seventh optical surface that connects the sixth optical surface to an eighth optical surface, and
  the eighth optical surface that allows the illumination light that entered through the sixth optical surface to exit the third prism; and
a fourth prism comprising:
  a ninth optical surface that allows the illumination light that exited the eighth surface to enter the fourth prism; and
  a surface perpendicular to a tenth optical surface that allows the illumination light that entered through the ninth optical surface to exit the fourth prism, and
wherein the projection light is the illumination light that exits through the surface perpendicular to the tenth optical surface, incident on and reflected by the reflective image display device, enters the fourth prism through the surface perpendicular to the tenth optical surface, and is reflected by the sixth optical surface.

* * * * *